US010332549B1

(12) United States Patent
Hutchinson et al.

(10) Patent No.: US 10,332,549 B1
(45) Date of Patent: Jun. 25, 2019

(54) TRANSDUCING HEAD PROTRUSION CONTROL

(71) Applicant: Seagate Technology LLC, Cupertino, CA (US)

(72) Inventors: Erik J Hutchinson, Eden Prairie, MN (US); Paul J Sonda, Minneapolis, MN (US); Lihong Zhang, Singapore (SG); Xiong Liu, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/973,013

(22) Filed: May 7, 2018

(51) Int. Cl.
*G11B 5/31* (2006.01)
*G11B 5/00* (2006.01)

(52) U.S. Cl.
CPC ............ *G11B 5/3136* (2013.01); *G11B 5/315* (2013.01); *G11B 2005/0021* (2013.01)

(58) Field of Classification Search
CPC .......... G11B 5/31; G11B 5/3136; G11B 5/315
USPC .............................................. 360/235–235.2
See application file for complete search history.

(56) References Cited

U.S. PATENT DOCUMENTS

| 7,298,597 | B2 | 11/2007 | Carey et al. | |
|---|---|---|---|---|
| 8,817,407 | B2 | 8/2014 | Wessel et al. | |
| 8,824,100 | B2 | 9/2014 | Karr et al. | |
| 9,324,351 | B2 | 4/2016 | Kong et al. | |
| 2003/0013227 | A1* | 1/2003 | Khlif ................. | G11B 5/102 438/106 |
| 2004/0075944 | A1* | 4/2004 | Macken .............. | G11B 5/10 360/123.28 |
| 2006/0193081 | A1* | 8/2006 | Pust ................... | G11B 5/3136 360/128 |
| 2007/0253116 | A1 | 11/2007 | Takahashi | |

* cited by examiner

*Primary Examiner* — Allen T Cao
(74) *Attorney, Agent, or Firm* — Westman, Champlin & Koehler, P.A.

(57) ABSTRACT

A slider includes a reader element, a bottom shield located adjacent to the reader element, a top shield located adjacent to the reader element, a heater, a substrate located below the reader element, the top shield, the bottom shield and the heater, and a cap substantially surrounding the reader element, the top shield, the bottom shield and the heater. The cap includes a base coat layer comprising a first electrically insulative cap material adjoining the substrate, and an overcoat layer comprising a second electrically insulative cap material adjoining the base coat layer opposite the substrate. The base coat layer and the overcoat layer meet at an interface located at or below the top shield. The first and second electrically insulative cap materials are different.

20 Claims, 5 Drawing Sheets

TRANSDUCING HEAD PROTRUSION CONTROL

SUMMARY

In one aspect, a slider includes a reader element, a bottom shield located adjacent to the reader element, a top shield located adjacent to the reader element, a heater, a substrate located below the reader element, the top shield, the bottom shield and the heater, and a cap substantially surrounding the reader element, the top shield, the bottom shield and the heater. The cap includes a base coat layer comprising a first electrically insulative cap material adjoining the substrate, and an overcoat layer comprising a second electrically insulative cap material adjoining the base coat layer opposite the substrate. The base coat layer and the overcoat layer meet at an interface located at or below the top shield. The first and second electrically insulative cap materials are different.

In another aspect, a transducing head includes a reader, a reader heater, a substrate located below the reader and the reader heater, and a cap substantially surrounding the reader and the reader heater. The reader includes a reader element, a bottom shield located below the reader element, and a top shield located above the reader element. The cap includes a first electrically insulative cap material adjoining the substrate, and a second electrically insulative cap material adjoining the first electrically insulative cap material opposite the substrate. The first and second electrically insulative cap materials meet at an interface located at or below a bottom edge of the top shield. The first and second electrically insulative cap materials are different.

In yet another aspect, a transducing head includes a reader, a reader heater located proximate the reader, a push block located proximate the reader heater, a writer, a substrate located below the reader and the reader heater, and a cap substantially surrounding the reader, the writer, and the reader heater. The reader includes a reader element, a bottom shield located below the reader element, and a top shield located above the reader element. The reader is located below the writer. The cap includes a first electrically insulative cap material adjoining the substrate and extending to a perimeter of the transducing head, and a second electrically insulative cap material adjoining the first electrically insulative cap material opposite the substrate. The first and second electrically insulative cap materials meet at an interface located at or below the top shield. The second electrically insulative cap material comprises alumina, and the first and second electrically insulative cap materials are different.

These aspects of the present disclosure are described merely by way of example and not limitation. Other features and benefits that characterize embodiments of the present disclosure will be apparent upon reading the following detailed description and review of the associated drawings.

While the above-identified figures set forth one or more embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features, steps and/or components not specifically shown in the drawings.

DETAILED DESCRIPTION OF ILLUSTRATIVE EMBODIMENTS

Data storage systems commonly have a recording head that includes a read transducer that reads information from a data storage medium and a write transducer that writes information to a data storage medium. Recording heads may also include other components such as a heater that is utilized to actuate, for example, the read transducer and/or the write transducer. Spacing of the recording head from the storage medium affects the strength of the read signal and the strength of the write signal. To achieve higher recording densities, the head is positioned closer to the medium, which decreases a head-medium spacing or fly height. A rate at which transducers are actuated (e.g., by a heater) is referred to as the stroke. The decreased fly height increases the propensity of the head to collide with asperities or particles on the medium and thereby increases the propensity for damage to the read transducer and the write transducer. However, in heat-assisted magnetic recording (HAMR) applications a passive fly height may be increased, with a corresponding emphasis on transducer actuation to decrease the spacing between a given transducer and the data storage medium during a reading or writing operation.

In general, the present disclosure provides protrusion control within a transducing head (also called a slider) while still permitting relatively high stroke performance when actuating a given transducer of the transducing head (e.g., using a heater). Magnetic data storage systems, such as those using HAMR, often utilize one or more heaters to actuate a transducer, such as a reader element, to actuate that transducer to adjust transducer-to-storage medium spacing. Transducer actuation (e.g., by a heater) causes movement of the transducer and is referred to as stroke. Stroke efficiency can be quantified by a measure of actuation distance over actuation power input (e.g., Å/mW for an electrically resistive heater). It is generally desired to have relatively high stroke efficiency, as well as relatively fast stroke actuation. It is further helpful to permit sufficient stroke distances (e.g., heat induced transducer protrusion) to be able to achieve desired transducer-to-storage medium spacing targets. Push block structures, such as those described in commonly-assigned U.S. patent application Ser. No. 15/901,592, can be utilized to control temperatures in a transducing head and improve stroke efficiency. Yet it is desired to further control protrusion and further improve stroke efficiency, including in transducing heads without a push block structure. Controlled protrusion can help promote improved stroke efficiency, which can reduce heater power and lower transducer operational temperatures. Moreover, controlled protrusion permits improved protrusion profiles at the media-facing surface, with localized reduction of transducer to storage medium spacing during a protrusion event while still maintaining greater spacing between the storage medium and one or more other portions of the transducing head. Furthermore, the transducing head may contact the storage medium during operation, and control of transducer stroke can help regulate such head-medium contact events. The present disclosure provides a multi-layer transducing head cap having layers of different materials. A base coat can be provided on a substrate with one or more overcoats (of one or more additional materials) above the base coat. The base coat can be made of a material that helps provide an additive protrusion effect, to increase protrusion of components located in or near that layer of cap material, while a material of an overcoat can produce relatively less protrusion at one or more other locations. A location and/or a height of the base coat can be selected to tailor protrusion properties as desired for particular applications. These and other features and benefits will be recognized by those of ordinary skill in the art in view of the entirety of the present disclosure, including the accompanying figures.

Hard disc drives are a common type of data storage system. The embodiments of the transducing head described herein can be used with a disc drive. However, other types of data storage systems should be considered within the scope of the present disclosure.

Figure 1:
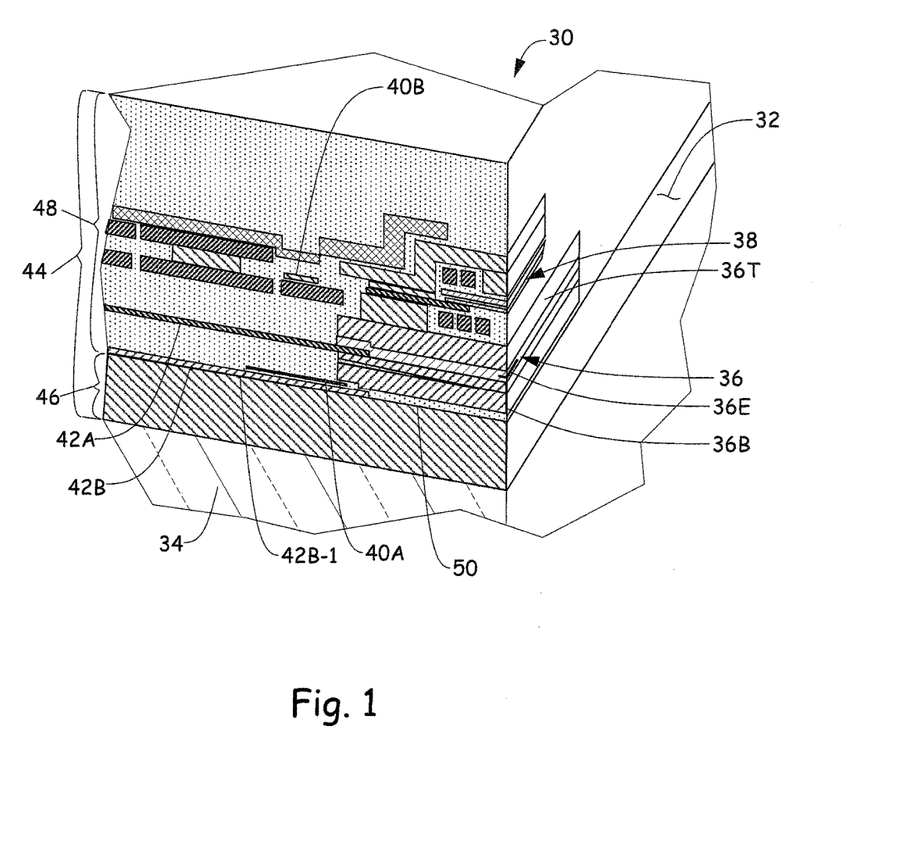
FIGS. 1-5 are perspective, cross-sectional views of embodiments of a transducing head.

FIG. 1 is a perspective, cross-sectional view of an embodiment of a transducing head (or slider) 30 with a media-facing surface 32, with the section plane taken normal to the media-facing surface 32. The media-facing surface 32 can act as an air bearing surface (ABS) that allows the transducing head 30 to fly above a storage medium (not shown) on a cushion of air (or other suitable fluid, such as helium) at a passive fly height. The illustrated transducing head 30 includes a substrate 34, a reader 36, a writer 38 and heaters 40A and 40B. In alternate embodiments, one or more additional transducers can be provided, for example, an additional reader. The substrate 34 can be formed of a ceramic material, such as AlTiC, or other suitable materials. The reader 36 and the writer 38 can be transducer assemblies capable of reading and writing, respectively, information from or to a magnetic storage medium (not shown), such as using heat-assisted magnetic recording (HAMR) techniques. The particular configurations of the reader 36 and the writer 38 can vary as desired for particular applications. As illustrated in FIG. 1, the reader 36 includes a bottom shield 36B, a reader element 36E, and a top shield 36T. The reader element 36E is located adjacent to and in between the top and bottom shields 36T and 36B. The reader element 36E is typically heat-sensitive, and it is desirable to limit read element operating temperatures to relatively low temperatures.

The heater (or reader heater) 40A is positioned proximate to the reader 36, and can generate thermal energy when provided with electrical current. The heater (or writer heater) 40B is positioned proximate to the writer 38, and can generate thermal energy when provided with electrical current. Additionally, as illustrated in FIG. 1 the transducing head 30 includes a push block assembly with a top push block 42A positioned proximate the reader element 36E (e.g., positioned in between the top and bottom shields 36T and 36B) and a bottom push block 42B located proximate the heater 40A. The bottom push block 42B is located below the heater 40A and the top push block 42A is located above the heater 40A as shown in FIG. 1. During operation of the transducing head 30, the heaters 40A and/or 40B can generate thermal energy for a protrusion event. Protrusion can occur due to thermal expansion caused by heat generated with the heaters 40A and/or 40B. In general, control of transducer stroke allows relatively precise positioning and transducer-medium spacing for a read or write operation, by facilitating temporary, local adjustments of transducer-medium spacing relative to a passive fly height of the transducing head 30 as a whole relative to the storage medium. Moreover, a close point along the media-facing surface 32 of the transducing head 30 can be influenced by the location and configuration of the push blocks 42A and 42B. For instance, the close point during a protrusion event for a read operation should be at or near the read element 36E to promote read signal strength.

A cap 44 is provided that adjoins the substrate 34. The reader 36, the writer 38, the heaters 40A and 40B, the push blocks 42A and 42B and other components are supported on the substrate 34 by the cap 44, which can partially or substantially surround those individual components (including subcomponents thereof, such as the reader element 36E). As explained further below, the cap 44 is generally made of electrically insulative materials.

The cap 44 as shown in FIG. 1 has a multi-layer configuration, with individual layers made of materials having different characteristics relevant to protrusion events. A first layer or electrically insulating cap material provides a base coat 46 that adjoins the substrate 34. As shown in FIG. 1, the base coat 46 extends to a perimeter of the transducing head 30, including the media-facing surface 32, an opposite top side, and side edges of the transducing head 30. As illustrated, there are no components embedded within the base coat 46, but embedded components can be provided in alternate implementations. In general, the material of the base coat 46 provides a suitable balance of characteristics such as electrical insulation, coefficient of thermal expansion (CTE), elasticity, and tribological properties such as relatively high hardness, surface smoothness and chemical inertness. Moreover, the material of the base coat 46 can be selected to be compatible with materials of the substrate 34, adjoining cap layer materials, and/or materials of transducer component in contact with the base coat 46. The elasticity (Young's modulus) of the base coat 46 generally follows the principle of an expanding rod to aid stroke efficiency. In this way the base coat 46 can expand more than the relatively more stiff, rigid substrate 44 during a protrusion event. The material of the base coat 46 can be a metal oxide, a carbide, a fluoride, a silicate, a nitride, or a composite (or hybrid) including a metal oxide. Examples of suitable materials for the base coat 46 are provided in Table 1. As a further example, a material of the base coat 46 can have a CTE in a range of about 7.6×10-6 to about 24×10-6 parts per million per degree kelvin (ppm/K), a thermal conductivity in a range of about 1 to about 30 watts per meter kelvin (W/mK), a Young's modulus less than approximately 80 gigapascals (GPa), and a hardness under a Vickers hardness test in a range of about 11 to about 18 GPa. As a still further example, the material of the base coat 46 can have a lower Young's modulus and higher thermal conductivity than the material of an overcoat 48, which is discussed further below. In addition to the materials listed in Table 1, other suitable materials include metal oxide binary compositions, such as $Al_2O_3.MgO$, $Al_2O_3.Y_2O_3$, $CaO.TiO_2$, $CaO.ZrO_2$, $CaO.SiO_2$, $MgO.SiO_2$, $MgO.ZrO_2$, $SrO.ZrO_2$, and $TiO_2.ZrO_2$, and some multiple metal oxide compositions, such as $MgO/Al_2O_3/TiO_2/ZrO_2/SiO_2$. Thermal-mechanical properties of the binary or multiple metal oxide compositions depend on the relative content (in mol %) of each component. The base coat 46 can be deposited by sputter deposition, or other vacuum deposition processes, for example. Composite materials can be deposited in a vacuum chamber with individual material or mixed material targets. Resultant deposited material composition changes mainly with target composition, but may also vary with deposition conditions. In terms of chemical vapor deposition, material composition can vary with precursor composition.

TABLE 1

| Material | CTE (ppm/K) | Thermal Conductivity (W/mK) | Vickers Hardness (GPa) | Young's Modulus (GPa) |
|---|---|---|---|---|
| $SiO_x$ | 2- | 1-1.2 | 6-7 | 66-75 |
| $Bi_2O_3$ | 14-24 | 1.3-2.2 | 2.9-4.5 | 24-73 |
| $TiO_2$ | 8.5 | 4.8 | 16 | 159-288 |
| $ThO_2$ | 9.2 | 12-14 | 11 | 150-220 |
| $Y_2O_3$ | 8 | 8-12 | 7.7 | 160 |
| $ZrO_2$ | 12 | 1.9-2.8 | 12.3 | 200 |
| $Dy_2O_3$ | 8.5 | 1.5-2.0 | 10 | ~130 |
| $Gd_2O_3$ | 10.5 | 13-21 | 4.9 | ~140 |
| TiAlN | 9 | 4 | 8-10 | ~170 |
| AlN | 5.3 | 40 | 11 | 223 |
| $MoSi_2$ | 8.5 | 53.92 | 13 | 225-232 |
| TiSi2 | 10.5 | 1.3 | 8.7-9.7 | ~142 |
| $ZrSi_2$ | 7.6 | 2.1 | 20 | 222-233 |
| $CaF_2$ | 24 | 9.71 | 1.6 | 75.8 |
| $MgF_2$ | 16 | 21-33.6 | 4.2 | 138 |
| $TiO_2 \cdot ZrO_2$ (~30 mol % $ZrO_2$) | 8.92 | 2-4 | 5-13 | 159-288 |

The cap 44 further includes the overcoat 48 that adjoins the base coat 46 opposite the substrate 34. The overcoat 48 is made of a different material than the base coat 46. For example, the overcoat 48 can be made from amorphous alumina ($Al_2O_3$), which has a CTE of 5.8 ppm/K, thermal conductivity of 1-5 W/mK, hardness (Vickers) of 15 GPa, and a Young's modulus of 132 GPa. In other implementations, the overcoat 48 can be made of another material, such as a material selected from Table 1 other than that used for the base coat 46. As shown in FIG. 1, the reader 36, the writer 38, the heaters 40A and 40B and the push blocks 42A and 42B are each partially or substantially surrounded by material of the overcoat 48.

An interface 50 is located where the base coat 46 meets the overcoat 48. As shown in FIG. 1, the interface 50 is substantially planar and is located at a bottom edge 42B-1 of the bottom push block 42B. A thickness of the base coat 46 (measured between the substrate 34 and the interface 50) can be selected as desired for particular applications. As shown in FIG. 1, the thickness of the base coat 46 is substantially less than a thickness of the overcoat 48.

When the heater 40A or 40B generates thermal energy during operation of the transducing head 30, to provide actuation, at least some of that thermal energy can be absorbed by the cap 44. Heating of the cap 44, including the components carried by or within the cap 44, causes thermal expansion that promotes protrusion along the media-facing surface 32 toward the storage medium (e.g., actuation). The different material properties of the base coat 46 and the overcoat 48 produce different thermal expansion profiles. For instance, greater protrusion can occur at or near the base coat 46 than at the overcoat 48 when the heater 40A generates heat for a read operation, which can produce greater protrusion of the reader 36 than of the writer 38. Such controlled thermal expansion facilitates good stroke efficiency by converting more thermal energy from the heater 40A into useful mechanical work for purposes of stroke and actuation of the reader 36. Additionally, by absorbing some thermal energy from the heater 40A, the base coat 46 helps to limit the operating temperature of the reader element 36E. In some example implementations, suitable performance characteristics can be achieved by selecting the material of the base coat 46 with a focus on relatively low Young's modulus characteristics and by selecting a different material of the overcoat 48 with a focus on relatively low CTE characteristics.

It should be noted that the configuration of the transducing head 30 is shown and described merely by way of example and not limitation. For instance, other configurations of the reader 36 and the writer 38 are possible, and relative positioning and spacing between certain components can vary as desired for particular applications. Moreover, although not specifically discussed above, the transducing head 30 can include one or more media-heating elements for HAMR applications. FIGS. 2-5 illustrate some alternative configurations, though still further alternative configurations are possible.

Figure 2:
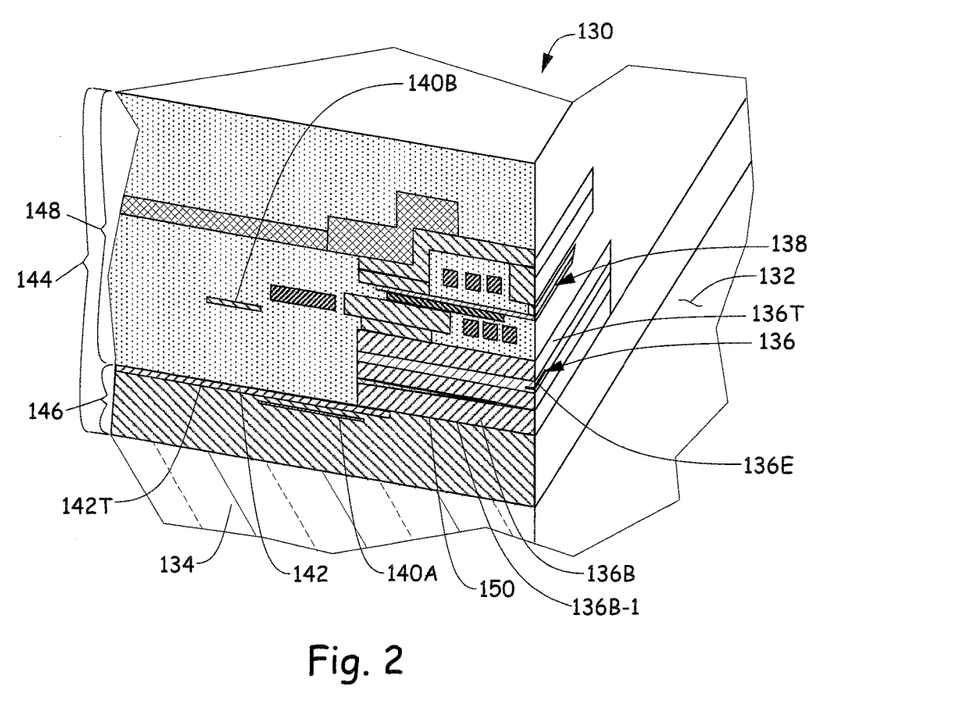

FIG. 2 is a perspective, cross-sectional view of another embodiment of a transducing head (or slider) 130. In general, the transducing head 130 includes components similar to those discussed above with respect to the transducing head 30, with reference numbers incremented by one hundred. The transducing head 130 differs from the transducing head 30 in that the heater 140A is located below the push block 142 (there being only a single reader push block). Moreover, the interface 150 is located at a bottom edge 136B-1 of the bottom shield 136B, and is further located at a top edge 142T of the push block 142. In this respect the base coat 146 extends from the substrate 134 to the bottom edge 136B-1 of the bottom shield 136B. As shown in FIG. 2, the heater 140A is substantially surrounded by material of the base coat 146, and the push block 142 is partially surrounded by material of the base coat 146. This also means that the interface 150 is located in between the reader 136 and both the heater 140A and the push block 142. Materials of the base coat 146 and the overcoat 148 can be selected as discussed above with respect to the transducing head 30.

Figure 3:
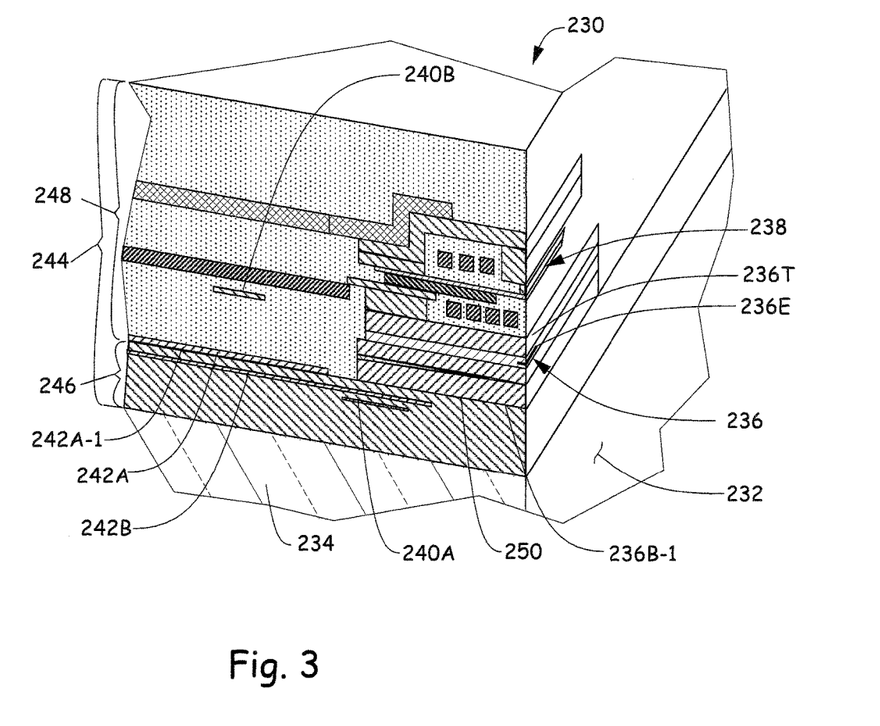

FIG. 3 is a perspective, cross-sectional view of another embodiment of a transducing head (or slider) 230. In general, the transducing head 230 includes components similar to those discussed above with respect to the transducing head 130 (and 30), with reference numbers incremented by one hundred. The transducing head 230 differs from the transducing heads 30 and 130 in that there is a multi-piece push block assembly with push blocks 242A and 242B. The heater 240A is located below the bottom push block 242B. Moreover, the interface 250 is located at the bottom edge 236B-1 of the bottom shield 236B, and is further located at a bottom edge 242A-1 of the top push block 242A. In this respect the base coat 246 extends from the substrate 234 to the bottom edge 236B-1 of the bottom shield 236B. As shown in FIG. 3, the heater 240A and the bottom push block 242B are both substantially surrounded by material of the base coat 246, and the top push block 242A is partially surrounded by material of the base coat 246. This also means that the interface 250 is located in between the reader 236 and the heater 240A, and that the interface 250 is located in between the top and bottom push blocks 242A and 242B. Materials of the base coat 246 and the overcoat 248 can be selected as discussed above with respect to the transducing head 30.

Figure 4:
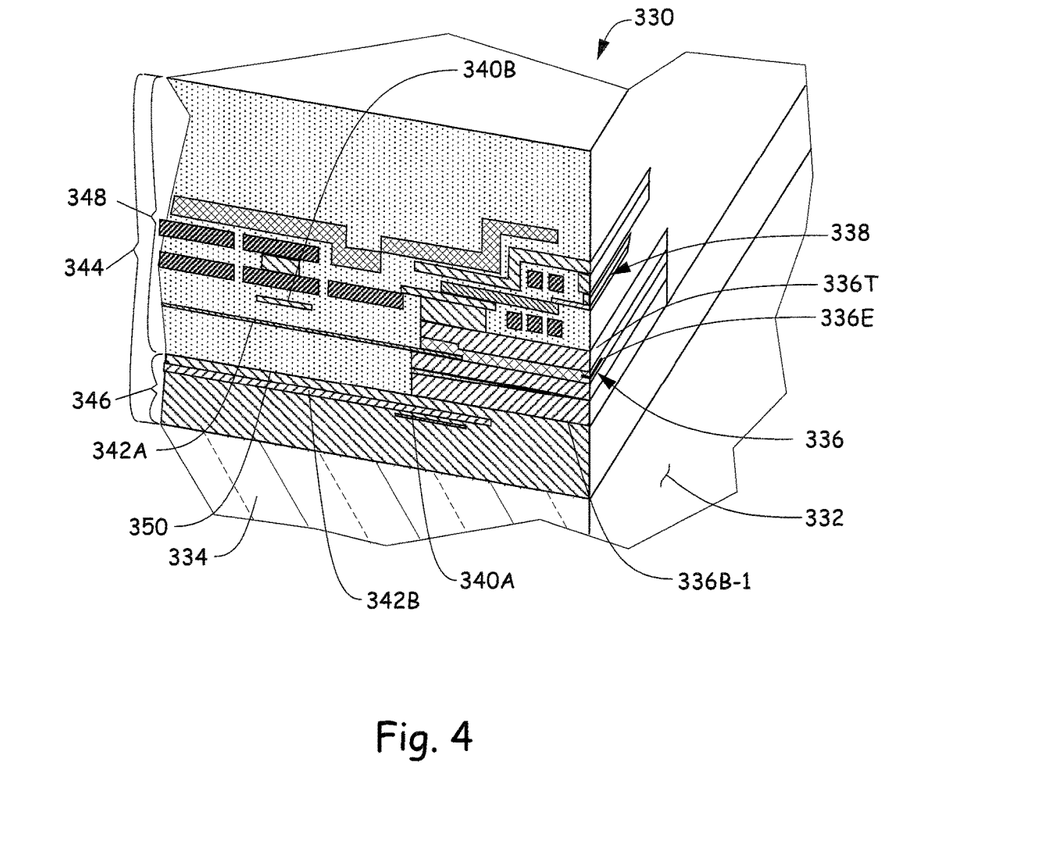

FIG. 4 is a perspective, cross-sectional view of another embodiment of a transducing head (or slider) 330. In general, the transducing head 330 includes components similar to those discussed above with respect to the transducing head 230 (and 30 and 130), with reference numbers incremented by one hundred. The transducing head 330 differs from the transducing head 230 in that the top push block 342A is located above the bottom shield 236B and the interface 350. The interface 350 where the base coat 346 and the overcoat 348 meet is located at the bottom edge 336B-1 of the bottom shield 336B. In this respect the base coat 346 extends from the substrate 334 to the bottom edge 336B-1 of the bottom shield 336B, and is spaced from the push blocks 342A and 342B. As shown in FIG. 4, the heater 340A and the bottom push block 342B are both substantially surrounded by material of the base coat 346. This also means that the interface 350 is located in between the reader 336 and the heater 340A, and that the interface 350 is located in between the top and bottom push blocks 342A and 342B. Materials of the base coat 346 and the overcoat 348 can be selected as discussed above with respect to the transducing head 30.

Figure 5:
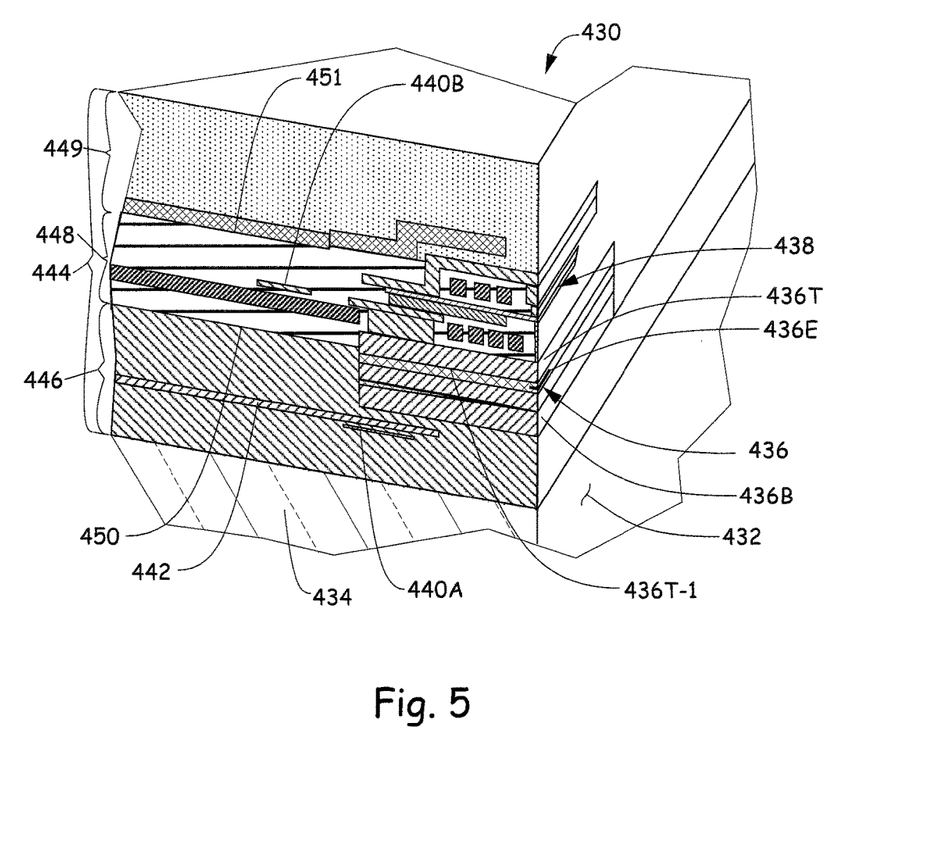

FIG. 5 is a perspective, cross-sectional view of another embodiment of a transducing head (or slider) 430. In general, the transducing head 430 includes components similar to those discussed above with respect to the transducing head 330 (and 30, 130 and 230), with reference numbers incremented by one hundred. The transducing head 430 differs from the transducing head 330 in a number of ways. First, the cap 444 includes three layers of different materials, including the base coat 446, the overcoat 448, and an additional overcoat (or top coat) 449. The interface 450 where the base coat 446 and the overcoat 448 meet is located at the bottom edge 436T-1 of the top shield 436T. In this respect the base coat 446 extends from the substrate 434 to the bottom edge 436T-1 of the top shield 436T. As shown in FIG. 5, the heater 440A, the push block 442 and the bottom shield 436B are each substantially surrounded by material of the base coat 446. This also means that the interface 450 is generally aligned with the reader 436. The additional overcoat 449 adjoins the overcoat 448 opposite both the base coat 446 and the substrate 434. An interface 451 is located where the overcoat 448 and the additional overcoat 449 meet. As shown in FIG. 5, the interface 451 is located at or near a top portion of the writer 438, and the heater 440B, is substantially surrounded by material of the overcoat 448. In this way, the overcoat 448 is positioned at or near the writer 438, while the additional overcoat 449 extends above the writer 438. Materials of the base coat 446, the overcoat 448 and the additional overcoat 449 can be selected as discussed above with respect to the transducing head 30. Each of the base coat 446, the overcoat 448 and the additional overcoat 449 can be made from a different material, or alternatively the base coat 446 and the additional overcoat 449 can be made from the same or substantially similar materials (e.g., alumina) and the overcoat 448 can be made of a different material (e.g., a material selected from Table 1). The particular materials of the layers of the cap 444 can be selected to contribute to control of the protrusion profile of the transducing head 444, including the relative protrusion profiles of the reader 436 and the writer 438. For example, in one implementation, the overcoat 448 can be made of a material with at least CTE, thermal conductivity, and Young's modulus properties that are slightly higher than those of a material of the base coat 446, while the additional overcoat 449 can have thermal conductivity and Young's modulus properties that are higher still but with lower CTE properties than the material of the overcoat 448.

It should be noted that the transducer head configurations discussed above and shown in the accompanying figures are disclosed only by way of example and not limitation. For instance, the particular reader and writer configurations can vary from those shown and/or described. Moreover, while interfaces between layers of a transducing cap have been described with respect to example locations, in further embodiments such interfaces can be located in other locations, such as any location at or below the reader.

While certain components and structures have been described using terms such as above, below, behind, and the like, such terms are used in a relative sense, in order to describe the positions and orientations of such objects in relation to each other. It should be understood that the components and structures described in such a manner can be located within a system that, as a whole, may be oriented or positioned different ways. Moreover, any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Additionally, a storage medium can be configured with discrete tracks that store data. Thus, transducing heads can be described relative to a downtrack direction and a cross-track direction arranged normal to the downtrack direction.

It is to be understood that even though numerous characteristics and advantages of various embodiments of the disclosure have been set forth in the foregoing description, together with details of the structure and function of various embodiments, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the transducing system while maintaining substantially the same functionality without departing from the scope and spirit of the present disclosure.

What is claimed is:

1. A slider comprising:
   a reader element;
   a bottom shield located adjacent to the reader element;
   a top shield located adjacent to the reader element;
   a heater;
   a substrate located below the reader element, the top shield, the bottom shield and the heater; and
   a cap substantially surrounding the reader element, the top shield, the bottom shield and the heater, the cap including:
      a base coat layer comprising a first electrically insulative cap material adjoining the substrate; and
      an overcoat layer comprising a second electrically insulative cap material adjoining the base coat layer opposite the substrate, wherein the base coat layer and the overcoat layer meet at an interface, wherein the interface is located at or below the top shield, and wherein the first and second electrically insulative cap materials are different.

2. The slider of claim 1, wherein the interface is located at a bottom edge of the top shield.

3. The slider of claim 1, wherein the interface is located at a bottom edge of the bottom shield.

4. The slider of claim 1, wherein the interface is located below a bottom edge of the bottom shield.

5. The slider of claim 4 and further comprising:
a push block located adjacent to the heater, wherein the interface is located at a bottom edge of the push block.

6. The slider of claim 1, wherein the cap further includes:
an additional overcoat layer comprising a third electrically insulative cap material adjoining the overcoat layer opposite the substrate, wherein the second and third electrically insulative cap materials are different.

7. The slider of claim 1, wherein the first electrically insulative cap material has:
a thermal expansion coefficient in a range of about $7.6 \times 10^{-6}$ to about $24 \times 10^{-6}$ ppm/K,
a thermal conductivity in a range of about 1 W/mK to about 30 W/mK,
a Young's modulus less than about 80 GPa, and
a hardness under a Vickers hardness test in a range of about 11 GPa to about 18 GPa.

8. The slider of claim 1, wherein the second electrically insulative cap material comprises alumina.

9. The slider of claim 1, wherein the heater is substantially surrounded by the first electrically insulative cap material.

10. The slider of claim 1, wherein the bottom shield is substantially surrounded by the first electrically insulative cap material.

11. The slider of claim 1, wherein the first electrically insulative cap material has a lower Young's modulus than the second electrically insulative cap material, and wherein the first electrically insulative cap material has a higher thermal conductivity than the second electrically insulative cap material.

12. The slider of claim 1, wherein the first electrically insulative cap material comprises silicon oxide, and wherein the second electrically insulative cap material comprises alumina.

13. A transducing head comprising:
a reader including:
a reader element;
a bottom shield located below the reader element; and
a top shield located above the reader element;
a reader heater;
a substrate located below the reader and the reader heater; and
a cap substantially surrounding the reader and the reader heater, the cap including:
a first electrically insulative cap material adjoining the substrate; and
a second electrically insulative cap material adjoining the first electrically insulative cap material opposite the substrate, wherein the first and second electrically insulative cap materials meet at an interface, wherein the interface is located at or below a bottom edge of the top shield, and wherein the first and second electrically insulative cap materials are different.

14. The transducing head of claim 13, wherein the interface is located at a bottom edge of the bottom shield.

15. The transducing head of claim 13, wherein the interface is located below a bottom edge of the bottom shield.

16. The transducing head of claim 13, wherein the cap further includes:
an additional overcoat layer comprising a third electrically insulative cap material adjoining the overcoat layer opposite the substrate, wherein the second and third electrically insulative cap materials are different.

17. The transducing head of claim 13, wherein the second electrically insulative cap material comprises alumina.

18. The transducing head of claim 13, wherein the first electrically insulative cap material has a lower Young's modulus than the second electrically insulative cap material, and wherein the first electrically insulative cap material has a higher thermal conductivity than the second electrically insulative cap material.

19. A transducing head comprising:
a reader including:
a reader element;
a bottom shield located below the reader element; and
a top shield located above the reader element;
a reader heater located proximate the reader;
a push block located proximate the reader heater;
a writer, wherein the reader is located below the writer;
a substrate located below the reader and the reader heater; and
a cap substantially surrounding the reader, the writer, and the reader heater, the cap including:
a first electrically insulative cap material adjoining the substrate and extending to a perimeter of the transducing head; and
a second electrically insulative cap material adjoining the first electrically insulative cap material opposite the substrate, wherein the first and second electrically insulative cap materials meet at an interface, wherein the interface is located at or below the top shield, wherein the second electrically insulative cap material comprises alumina, and wherein the first and second electrically insulative cap materials are different.

20. The transducing head of claim 19, wherein the first electrically insulative cap material has a lower Young's modulus than the second electrically insulative cap material, and wherein the first electrically insulative cap material has a higher thermal conductivity than the second electrically insulative cap material.

* * * * *